United States Patent [19]

DuRocher et al.

[11] Patent Number: 5,453,588
[45] Date of Patent: Sep. 26, 1995

[54] STEERING COLUMN STALK SWITCH APPARATUS

[75] Inventors: Daniel J. DuRocher, Leonard; Ellsworth S. Miller, Rochester Hills, both of Mich.

[73] Assignee: ITT Corporation, New York, N.Y.

[21] Appl. No.: 97,268

[22] Filed: Jul. 23, 1993

Related U.S. Application Data

[63] Continuation of Ser. No. 972,597, Nov. 6, 1992, abandoned.

[51] Int. Cl.⁶ .................................................... H01H 9/02
[52] U.S. Cl. ............................... 200/61.54; 200/61.27
[58] Field of Search ............................... 200/4, 6 R, 6 A, 200/17 R, 18, 61.27, 61.54

[56] References Cited

U.S. PATENT DOCUMENTS

| | | | |
|---|---|---|---|
| 3,209,092 | 9/1965 | Vitaloni et al. | 200/61.34 |
| 3,459,913 | 8/1969 | Mutschler et al. | 200/166 |
| 3,476,896 | 11/1969 | Schreiber | 200/61.54 |
| 3,719,787 | 3/1973 | Tomecek | 200/61.27 |
| 3,892,932 | 7/1975 | Erdelitsch et al. | 200/61.27 |
| 3,934,101 | 1/1976 | Jones | 200/5 B |
| 3,940,579 | 2/1976 | Bühl et al. | 200/4 |
| 4,129,757 | 12/1978 | Cryer | 200/4 |
| 4,149,048 | 4/1979 | Winter et al. | 200/61.54 |
| 4,219,706 | 8/1980 | Koch et al. | 200/4 |
| 4,277,658 | 7/1981 | Delp et al. | 200/61.54 |
| 4,291,213 | 9/1981 | Felland et al. | 200/335 |
| 4,293,743 | 10/1981 | Iwata et al. | 200/4 |
| 4,327,264 | 4/1982 | Botz et al. | 200/295 |
| 4,336,428 | 6/1982 | Berginski | 200/61.54 |
| 4,376,236 | 3/1983 | Long et al. | 200/61.27 |
| 4,376,237 | 3/1983 | Long | 200/61.27 |
| 4,379,954 | 4/1983 | Iwata et al. | 200/4 |
| 4,387,279 | 6/1983 | Brevick | 200/61.54 |
| 4,400,598 | 8/1983 | Jandi et al. | 200/16 D |
| 4,404,438 | 9/1983 | Honjo | 200/61.54 |
| 4,543,848 | 10/1985 | Beauch | 74/493 |
| 4,648,728 | 3/1987 | Erdelitsch et al. | 384/537 |
| 4,678,875 | 7/1987 | Erdelitsch et al. | 200/61.54 |
| 4,723,057 | 2/1988 | Lane, Jr. | 200/61.27 |
| 4,739,130 | 4/1988 | Roller et al. | 200/61.27 |
| 4,791,253 | 12/1988 | Erdelitsch et al. | 200/61.27 |
| 4,810,839 | 3/1989 | Chretien | 200/4 |
| 4,857,815 | 8/1989 | Erdelitsch et al. | 318/443 |
| 4,882,457 | 11/1989 | Erdelitsch et al. | 200/61.54 |
| 4,920,239 | 4/1990 | Bühler et al. | 200/61.59 |
| 5,049,706 | 9/1991 | De Rocher | 200/61.54 |
| 5,120,014 | 6/1992 | Kerner et al. | 200/61.54 |
| 5,170,884 | 12/1992 | Hauk | 200/17 R |

FOREIGN PATENT DOCUMENTS

| | | | |
|---|---|---|---|
| 0329968 | 1/1989 | European Pat. Off. | H01H 11/00 |
| 1904616 | 1/1969 | Germany . | |
| 2533802 | 7/1975 | Germany | H01H 1/20 |
| 2620192 | 4/1979 | Germany | H01H 21/22 |
| 3122353 | 6/1981 | Germany | H01H 25/04 |
| 3128752 | 7/1981 | Germany | H01H 21/82 |
| 3219579 | 5/1982 | Germany | H01H 25/00 |
| 3237055 | 10/1982 | Germany | H01H 15/02 |
| 3336878 | 10/1983 | Germany | H01H 13/52 |
| 3336877 | 10/1983 | Germany | H01H 13/52 |
| 3402082 | 1/1984 | Germany | H01H 13/52 |
| 1327040 | 12/1969 | United Kingdom | G05G 9/12 |
| 2135126 | 1/1983 | United Kingdom | H01H 25/00 |
| 2135125 | 1/1983 | United Kingdom | H01H 25/00 |

Primary Examiner—A. D. Pellinen
Assistant Examiner—Michael A. Friedhofer
Attorney, Agent, or Firm—Robert P. Seitter; J. Gordon Lewis

[57] ABSTRACT

A steering column mounted stalk switch apparatus includes an elongated shaft having a hub fixedly mounted at one end. The hub fixedly engages one end of a hollow knob housing. An aperture is formed in the opposite end of the housing and movably receives a button therein having at least one electrical contact mounted thereon. A carrier is slidably mounted in the housing for movement between a plurality of discrete positions and includes a projection extending externally through a side wall of the housing. Electrical contacts are mounted on the carrier and engage conductive tracings on the circuit board as the carrier is moved between the discrete positions.

51 Claims, 4 Drawing Sheets

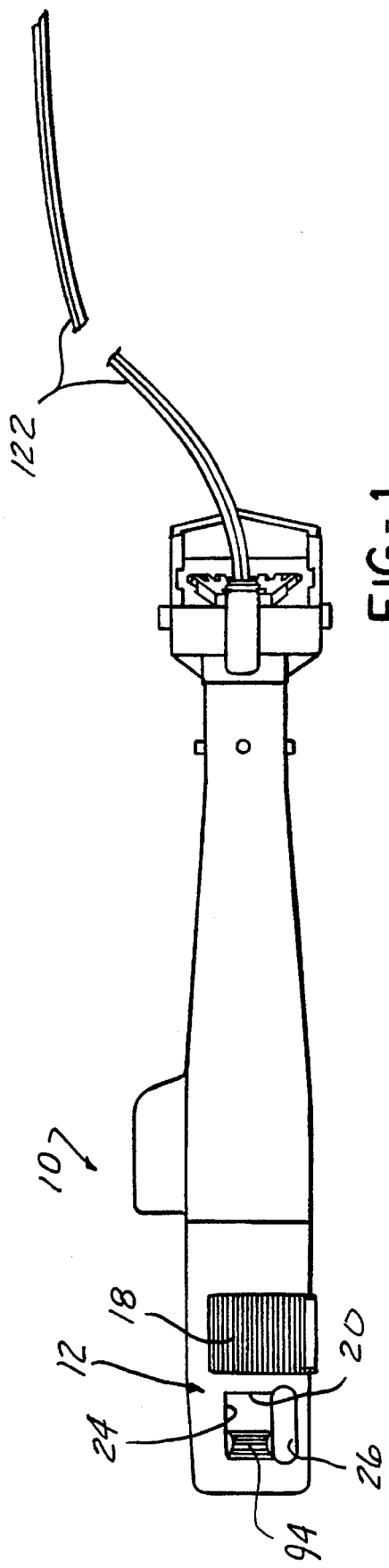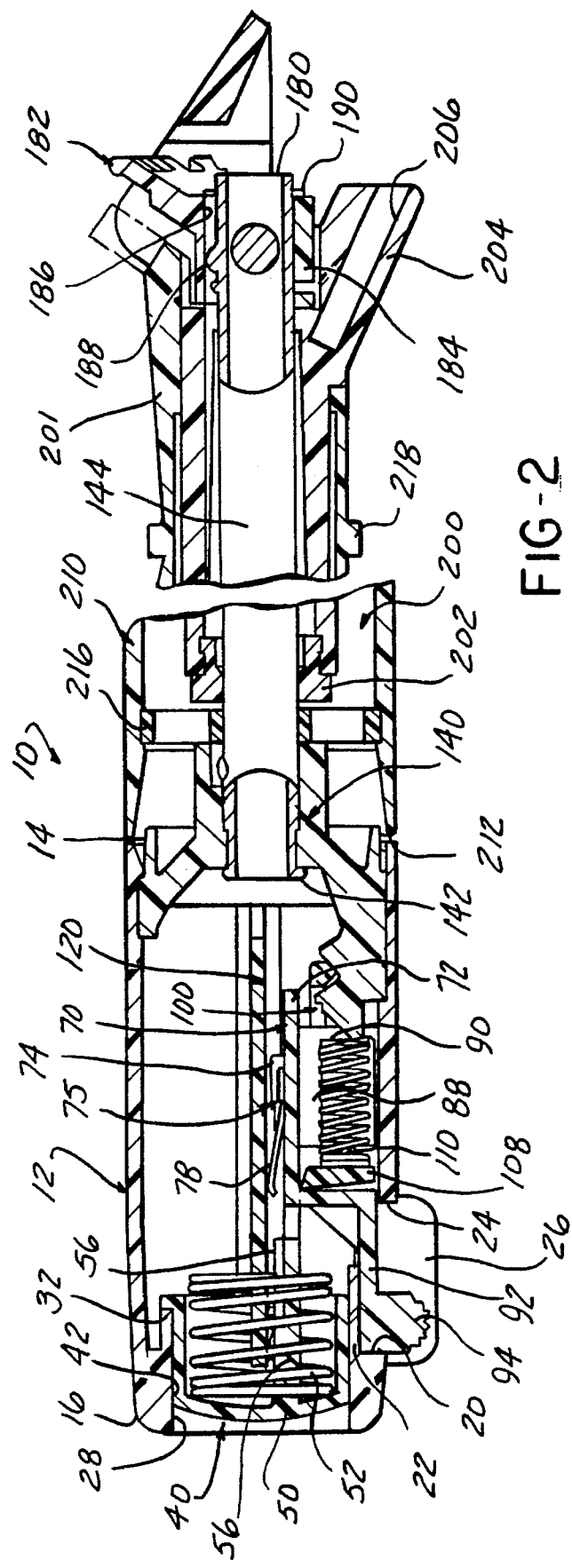

STEERING COLUMN STALK SWITCH APPARATUS

This application is a continuation of application Ser. No. 07/972,597, filed on Nov. 6, 1992, now abandoned.

FIELD OF THE INVENTION

The present invention relates, in general, to motor vehicles and, more specifically, to steering column mounted switches controlling vehicle operating circuits and devices.

STATE OF THE ART

The evolution of steering column switches in motor vehicles has been toward greater integration of functions in a single switch. Previously, a plurality of individual switches, each controlling a single function, i.e., turn signals, windshield wipers, etc., were mounted on the vehicle dashboard or steering column. Current steering column switches are designed to control a variety of functions or vehicle operating circuits, for example, turn signals/hazard lights, high beam and low beam headlights with optional flash-to-pass, parking lights, and windshield wiper and wash functions, including multi-speed wipers with or without delay.

Typically, a steering column switch includes a single lever or stalk pivotally mounted on one side of a housing attached to the steering column in an easily accessible position for the driver of the vehicle. The lever is gimballed at one end in the housing so as to move in one of two mutually separate planes. Further, the lever may be provided with a rotatable end cap as well as a slidable member movable along the longitudinal axis of the lever. Actuators are mounted in the housing and, in response to movement of the lever in one direction, i.e., such as in one of the two mutually separate planes, or rotation of the end cap, move a switching member carrying contacts between various switching positions to effect the switching of electrical connections for particular vehicle operating circuit.

In a typical application, pivotal movement of the lever in a substantially vertical plane about its gimballed connection to the housing controls the vehicle turn signals, and pivotal movement of the lever in a substantially horizontal plane controls the switching of the vehicle headlights between low beam, high beam and, optionally, flash-to-pass. Rotation of the end cap is used to control the operation of the vehicle windshield wiper system between on and off states and, optionally, a plurality of intermittent distinct speeds.

In vehicles employing an automatic cruise control, a slide switch or member is mounted in the end cap and is selectively movable between various positions including off, on, and a momentary resume set speed position. A spring-biased button is movably mounted in the end of the end cap and is employed to set a desired speed for the cruise control device. Movement of the slide member and/or the button between various positions cause electrical contacts mounted within the lever to close various circuits of the cruise control device depending upon the specific position of the slide member and the set speed button.

It is imperative in vehicles employing a cruise control device that the cruise control be designed to insure that the momentary resume set speed position is completely momentary such that a sticking of the switch member in the resume position is prevented. Furthermore, the steering column stalk switch must be easily and smoothly operable and, at the same time, must present a positive, user friendly tactile feel.

To achieve these goals, the stalk switch must be designed with no looseness or play between the various members and must insure that the slide member positively engages each of the various detent positions during operation.

Thus, it would be desirable to provide a steering column stalk switch which incorporates numerous vehicle operating circuit functions into a single switch lever assembly. It would also be desirable to provide a steering column stalk switch which provides easy and smooth operation of the various movable components thereof and, at the same time, provides a positive, tactile feel for the movement of such components between various positions. It would also be desirable to provide a steering column stalk switch assembly which is easily assembled for a low manufacturing cost.

SUMMARY OF THE INVENTION

The present invention is a stalk switch apparatus mountable on a steering column of a motor vehicle for controlling various operating circuits and devices in the vehicle.

The stalk switch apparatus includes an elongated shaft having first and second opposed ends, the first end being pivotally attached to a switch housing mountable on the steering column of a vehicle. A hub is fixedly mounted on the second end of the shaft. A hollow housing with first and second ends is provided, the hub fixedly engaging the first end of the housing. A circuit board is disposed in the housing in fixed engagement with the hub. The circuit board includes a plurality of electrically conductive tracings disposed at timed intervals, with electrical conductors extending from the conductive tracings exteriorly of the shaft to various operating circuits in the vehicle, such as, for example, a vehicle cruise control device.

A first aperture is formed in the second end of the housing. A button is mounted in the housing and is accessible through the first aperture. The button is movable between first and second positions. A button biasing means is mounted in the housing and is seated between the circuit board and the button for biasing the button to the first position and for biasing the circuit board into fixed engagement with the hub. A plurality of first electrical contacts are mounted on the button and engage certain conductive tracings on the circuit board when the button is in the second position to close an electrical circuit connected to the certain conductive tracings. For example, the conductive tracings engaged by the first electrical contacts can be connected to the set speed circuit of a vehicle cruise control.

A carrier having first and second ends is slidably mounted in the housing. A radially outward extending projection is formed on the second end of the carrier and extends through a side wall aperture in the housing. A detent paw having first and second opposed ends is mounted on the carrier for movement between first and second positions with respect to the carrier. Means are mounted on the carrier in engagement with the second end of the detent paw for biasing the detent paw to the first position.

An arm is formed on the hub and extends axially therefrom. First and second spaced detents are formed on the arm. In addition, a ramp surface extends angularly from the second detent on the arm. The arm and the first end of the detent paw are axially aligned such that the first end of the detent paw is slidably movable between the first and second detents and along the angular ramp during sliding movement of the carrier. The detent paw biasing means engages the arm when the carrier is urged to a position in which the first end of the detent paw extends beyond the second detent and along the angular ramp for biasing the carrier toward the second detent. A lever is mounted about the shaft, contiguous with the exterior surface of the housing.

A plurality of second electrical contacts are mounted on the carrier. Each of the second electrical contacts, as well as the first electrical contacts, are in the form of resilient arms cantilevered from a first end attached to the carrier and the button and are movably disposed away from the carrier and the button at the second end. Further, the second ends of each of the plurality of first and second electrical contacts extend in the same direction toward the button so as to simplify the assembly of the stalk switch apparatus.

A plurality of second electrically conductive tracings are also arranged on the circuit board and are slidably engaged by the plurality of second electrical contacts. Each of the second group of second electrically conductive tracings also has a different starting point from one end of the circuit board for selective engagement with one of the plurality of second electrical contacts as the second electrical contacts are moved with the carrier between discrete carrier positions. In an exemplary embodiment, the second electrical contacts and associated second conductive tracings are respectively connected to the off, on, and resume set speed circuits of a vehicle cruise control.

The arm on the hub preferably includes a base wall, a first end connected to the hub and a second end spaced from the first end and extending axially outward from the hub. A first projection extends from the second end of the arm in a predetermined profile from the base wall. A second projection is also formed on the arm and is spaced from the first projection. The second projection has a second profile. The first detent is formed between the first and second projections. The angular ramp extends from the terminus of the second projection angularly from the base wall at a predetermined angle. The second detent is formed between the second projection and the start of the angular ramp.

The carrier preferably includes a base having a pair of spaced walls formed thereon. An inwardly extending flange is formed on one end of each wall and faces and is spaced from the flange on the opposed wall to define an aperture through the two walls. The detent paw is mounted exteriorly around the walls on the base of the carrier. The first end of the detent paw is disposed adjacent to and outside of the aperture formed between the flanges on the walls. The means for biasing the detent paw preferably comprises a coil spring which is seated between the flanges on the walls of the carrier and the second end of the detent paw. The coil spring is aligned with the second end of the arm on the hub so as to be engaged by an angular ramp formed on the second end of the arm as the carrier is moved toward the first end of the shaft and the detent paw moves from the second detent along the angular ramp on the arm. The spring is compressed by the second end of the arm and provides a compressive force to positively return the first end of the detent paw to the second detent on the arm when user force on the carrier is released. This minimizes the possibility of any sticking of the first end of the detent paw on the angular surface of the arm.

The steering column mounted stalk switch apparatus of the present invention has a unique configuration which simplifies assembly and insures a positive tactile feel to movement of the button and the carrier between various positions. The profile, ramp angle and height of the various projections on the arm forming the first and second detents and the angular inclined ramp surface as well as the spring force of the detent biasing spring may be tailored to meet the needs of a particular application insofar as providing different detent locking movements, tactile feel, etc.

Further, the steering column stalk switch apparatus uniquely orients the cantilevered first and second contacts in the same direction so as to simplify the insulation of the contacts and the circuit board carrying the conductive tracings in the housing. Furthermore, the button biasing spring serves a dual purpose as it not only biases the button to a normal first position; but, also, urges the circuit board into fixed engagement with the hub to take up any tolerance or slack in the assembly of these components of the stalk switch apparatus. The detent paw biasing means or coil spring also serves a dual purpose in that it biases the detent paw to a first position and, also, biases the carrier toward the second detent position when the carrier is moved forward thereby assuring that the carrier and the detent paw mounted thereon will positively return to the second detent from the angular inclined surface or ramp after a moving force on the carrier has been released.

BRIEF DESCRIPTION OF THE DRAWING

The various features, advantages and other uses of the present invention will become more apparent by referring to the following detailed description and drawing in which:

FIG. 1 is a front elevational view of a steering column stalk switch apparatus according to the present invention;

FIG. 2 is a longitudinal cross sectional view generally taken along line 2—2 in FIG. 1;

DESCRIPTION OF THE PREFERRED EMBODIMENTS

Figure 3:
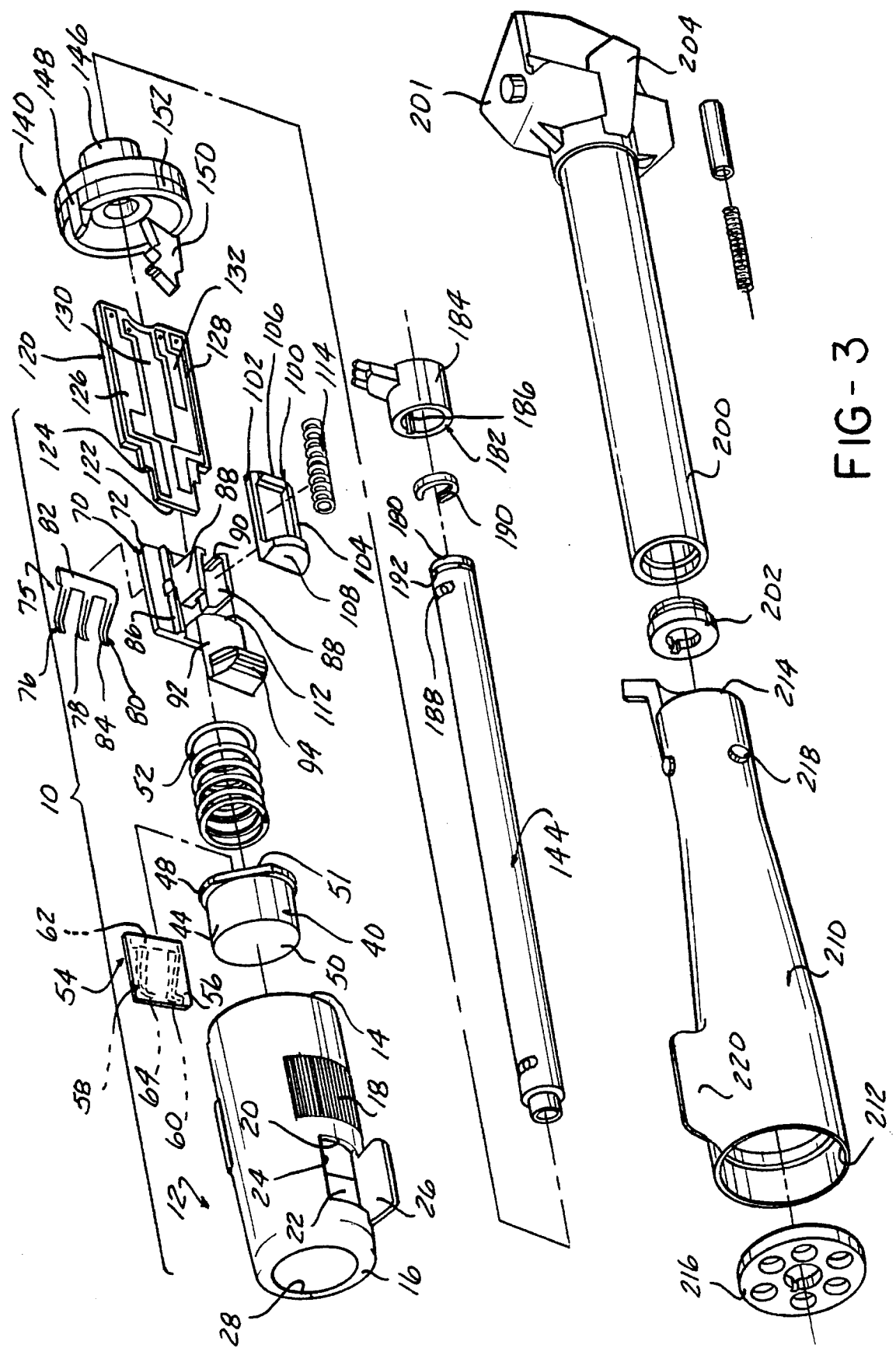
FIG. 3 an exploded, perspective view of the steering column stalk switch apparatus shown in FIG. 1.

Referring now to the drawing, and to FIG. 1 in particular, there is illustrated a steering column mounted stalk switch apparatus 10 which is operative to control the operation of various vehicle operating circuits and devices, such as a vehicle windshield wiper and washer controls, turn signals, vehicle headlight switching between low and high beam and the on, off, set and resume set speed operations of a vehicle cruise control device.

Figure 4:
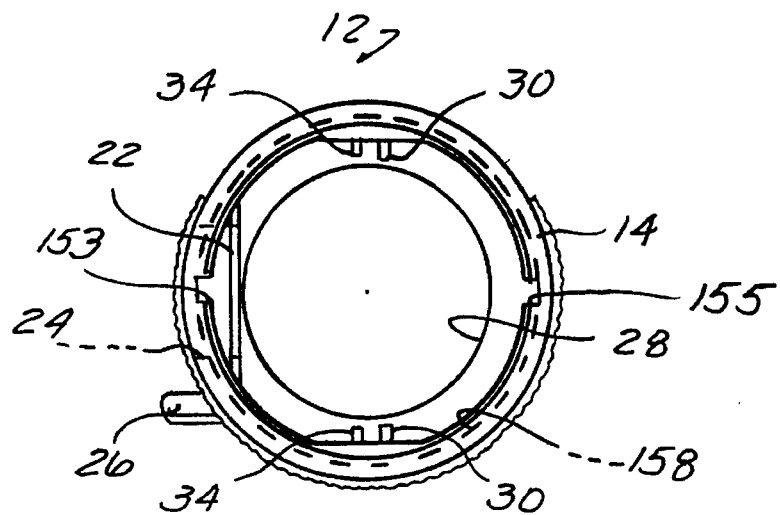
FIG. 4 is a right and elevational view of the knob housing of the steering column stalk switch apparatus shown in FIG. 1.

As shown in FIG. 1, and in greater detail in FIGS. 2–4, the steering column stalk switch apparatus 10 includes a knob or housing 12 which may be stationarily or, preferably, rotatably mounted on the end of the stalk switch apparatus 10.

The housing 12 is hollow and is preferably formed of molded plastic. The housing has first and second opposed ends 14 and 16, respectively, and a side wall which tapers from the slightly larger diameter first end 14 to the smaller diameter second end 16. A gripping ring 18, preferably in the form of an annular arrangement of knurls, is formed exteriorly on the side wall of the housing 12 to aid in rotating the housing 12.

A slot 20 is formed in the side wall of the housing 12 adjacent the second end 16. A wall 22 is integrally formed with the side wall of the housing 12 but is inset in the slot 20 to close off a portion of the length of the slot 20 as shown in FIGS. 2 and 3. A first aperture 24 is formed between the end of the wall 22 and one edge of the slot 20 as shown in FIG. 3. A protective tab 26 is integrally formed with the side wall of the housing 12 and extends radially outward from the housing 12 below the slot 20.

A second aperture 28 is formed in the second end 16 of the housing 12, the purpose of which will be described in greater detail hereafter. As shown in FIG. 4, a plurality of internally formed pairs of ribs are formed in the housing 12 and provide mounting seats for various components of the stalk switch apparatus 10, as described hereafter. A first pair of ribs 30 are formed in a diametrically opposed manner in the housing 12. The ribs 30 extend substantially the entire length of the housing 12 from the first end 14 to the inner edge of an internal sleeve 32 which extends inward from the second end 16 of the housing 12 and is spaced at the inner end from the side wall of the housing 12 as shown in FIG. 2. A second pair of diametrically opposed ribs 34 are also formed in the housing 12 and are circumferentially spaced from the first pair of ribs 30. The second pair of ribs 34 extends only partially from the inner edge of the sleeve 32 toward the first end 14 of the housing 12.

Further details of the housing 12 will be described hereafter in conjunction with other components of the steering column stalk switch assembly 10.

Figure 5:
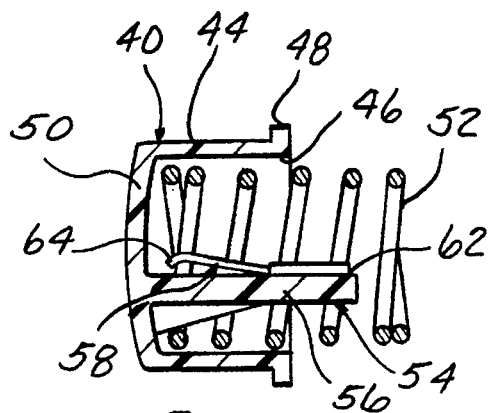
FIG. 5 is a longitudinal cross sectional view of the set button shown in FIGS. 2 and 3.

A button 40 is movably mounted in a bore 42 formed by the internal sleeve 32 in the second end 16 of the housing 12. As shown in FIG. 5, the button 40 is in the form of a hollow cap-like member having a cylindrical side wall 44, an open first end 46 bounded by a radially outwardly extending flange 48 and a solid second end wall 50. A flat 51, shown in FIG. 2, is formed in a limited angular portion of the annular flange 48 and slidably engages the inner portion of the wall 22 in the slot 20 in the housing 12 to key the position of the button 40 in a desired orientation within the housing 12.

A button biasing means, denoted generally by reference number 52, is mounted within the interior of the button 40 and extends partially outward from the first end 46 thereof. The button biasing means 52 is preferably in the form of a coil spring which seats at one end on the solid second end wall 50 of the housing 44 of the button 40.

A first electrical contactor 54 is fixedly mounted within the button housing 44 by any suitable means, such as, preferably, by heat staking. The first electrical contactor 54 includes a plastic base 56. A plurality of first electrical contacts, such as two electrical contacts 58 and 60, are mounted on the base 56. The contacts 58 and 60 are integrally connected at a first end 62 and each extends to a second end 64 in a direction toward the solid second end wall 50 of the button housing 44 in a resilient, cantilevered fashion. The contacts 58 and 60 are formed of any suitable electrically conductive material, such as copper. As shown in FIG. 5, the second ends 64 of each of the contacts 58 and 60 are spaced from the base 56 of the first electrical contactor 54.

As shown in FIGS. 2, 3, 6 and 7, a carrier 70 is slidably mounted within the knob housing 12. The carrier 70 includes a generally rectangular or square base 72 formed of an insulating material, such as plastic. A pair of spaced clips 74 are formed on one surface of the base 72 of the carrier 70 and include a portion spaced from one surface of the base 72. The clips 74 are spaced apart on the base 72 and snappingly receive a second electrical contactor 75 therein.

Figure 7:
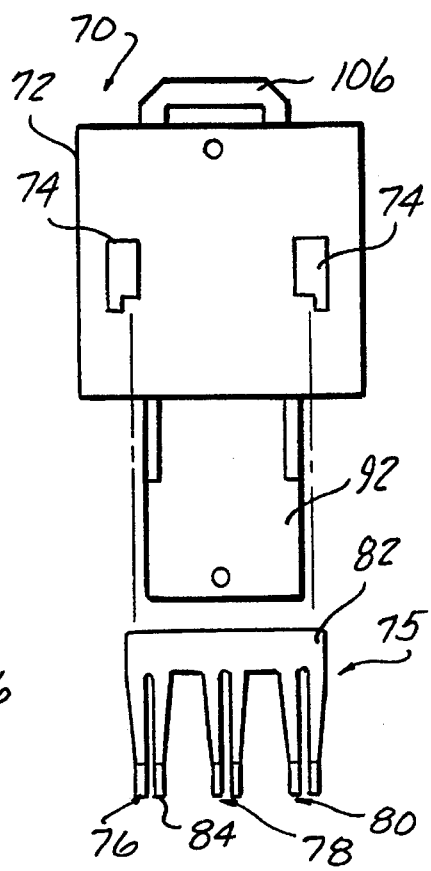
FIG. 7 is an exploded, front elevational view showing the mounting of the second electrical contactor on the carrier.

As shown in FIGS. 2, 3 and 7, the second electrical contactor 75 includes a plurality of bifurcated, resiliently movable contacts, such as contacts 76, 78 and 80. Each of the contacts 76, 78 and 80 are integrally joined together at a first end 82. The first end 82 is mounted in the clips 74 in a snap-together fit to securely attach the second electrical contactor 75 to the base 72 of the carrier 70. The second ends 84 of each of the contacts 76, 78 and 80 extends from the common first end 82 upwardly and outwardly away from the clip 74 when the second contactor 75 is mounted on the base 72 of the carrier 70. It should be noted that the second ends 84 of each of the contacts 76, 78 and 80 of the second electrical contactor 75 extend toward the solid second end wall 50 of the button 40 in the same manner as the contacts 58 and 60 of the first electrical contactor 54.

Figure 6:
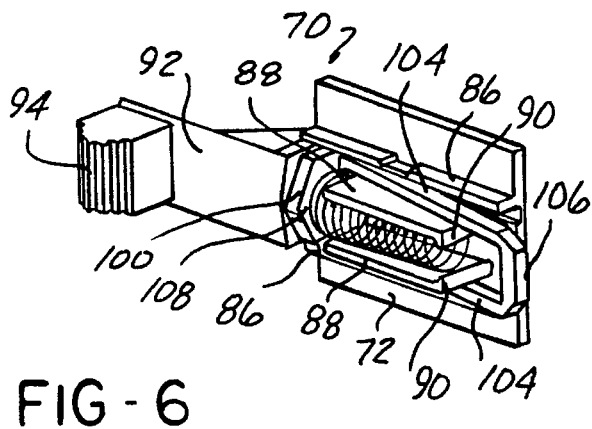
FIG. 6 is a perspective view showing the assembled carrier, detent paw and detent biasing spring.

An outer pair of side walls 86 are formed on the opposite surface of the base 72 of the carrier 70 as shown in FIGS. 3 and 6. The outer pair of side walls 86 have a relatively short height. An inner pair of side walls 88 are formed between the outer pair of side walls 86 and have a greater height so as to extend above the outer pair of side walls 86. The inner pair of side walls 88 are spaced apart and have an inwardly facing flange 90 formed at one end. The flanges 90 face each other and are spaced apart to define an aperture therethrough.

An L-shaped leg 92 is integrally formed with and extends above and longitudinally outward from one end of the base 72 of the carrier 70. An arcuate projection 94 is formed at one end of the leg 92. The leg 92 is configured to be slidably disposed in the slot 20 in the knob housing 12 in engagement with the outer surface of the wall 22 formed in the slot 20. In this mounting orientation, the projection 94 extends exteriorly of the slot 20 above the protective tab 26. The projection 94 forms a suitable surface for user engagement to slidably move the carrier 70 between a number of positions, as described hereafter.

A detent paw 100 is mounted on the carrier 70. The detent paw 100 has a generally rectangular shape formed of opposed side walls 102 and 104 which are mountable between the inner and outer pair of walls 86 and 88 on the carrier 70. The detent paw 100 also includes a first end 106 and a raised, opposed second end 108. A projection 110, shown in FIG. 2, is formed on the raised second end 108 of the detent paw 100 and faces the first end 106.

The raised second end 108 is mounted between the ends of the inner walls 88 of the carrier 70 and a shoulder 112 formed by a portion of the leg 92 extending upward from the base 72 of the carrier 70.

Detent biasing means 114, preferably in the form of a coil spring, is mounted under a preload force on the carrier 70. The detent biasing means or spring 114 seats over the projection 110 on the raised second end 108 of the detent paw 100 and the inwardly extending flanges 90 on the inner walls 88 of the carrier 70. In this position, as shown in FIG. 6, the spring 114 exerts a force against the second end 108 of the detent paw 100 to pivot the first end 106 of the detent paw 100 away from the base 72 of the carrier 70. However, the first end 106 of the detent paw 100 is capable of movement toward the base 72 of the carrier 70 during sliding movement of the carrier 70 as described hereafter.

In assembling the components described thus far, the first electrical contactor 54 is fixedly mounted in the button 40 by heat staking or other suitable means with the raised second ends 64 of the contacts 58 and 60 of the first electrical contactor 54 extending toward the second end or solid end wall 50 of the button 40. The button 40 is then slidably mounted in the knob housing 12 with the flat 51 on the button 40 aligned with the inner surface of the wall 22 in the slot 20 in the housing 12 to properly align the button 40 in the housing 12. In this position, the solid end wall 50 is accessible exteriorly through the second aperture 28 in the second end 16 of the housing 12, as shown in FIG. 2.

The detent paw 100 is mounted on the carrier 70 such that the side walls 102 and 104 are disposed between the pairs of inner and outer walls 86 and 88 on the carrier 70. The biasing spring 114 is then inserted between the flanges 90 of the inner walls 88 and the raised second end 108 of the detent paw 100. The spring 114 is thus under a compressive force and biases the first end 106 of the detent paw 100 away from the base 72 of the carrier 70.

Next, the carrier 70 is slidably inserted into the housing 12 such that the surface of the base 72 on which the clips 74 are mounted slidably engages one side of the diametrically opposed ribs 34. The clips 74 are thus disposed between the ribs 34. The carrier 70 is inserted into the housing 12 to bring the projection 94 outward through the slot 20 with the leg 92 slidably engaging the inner wall 22, as shown in FIG. 2. In this position, the carrier 70 is capable of sliding movement to the right, in the orientation shown in FIG. 2 and 3, with the leg 92 completely covering the aperture 24 in the housing 12. Likewise, the inner wall 22 in the housing 12 cooperates with the leg 92 of the carrier 70 to close off the aperture 24 at all times to prevent the entry of foreign matter into the interior of the housing 12.

Figure 8:
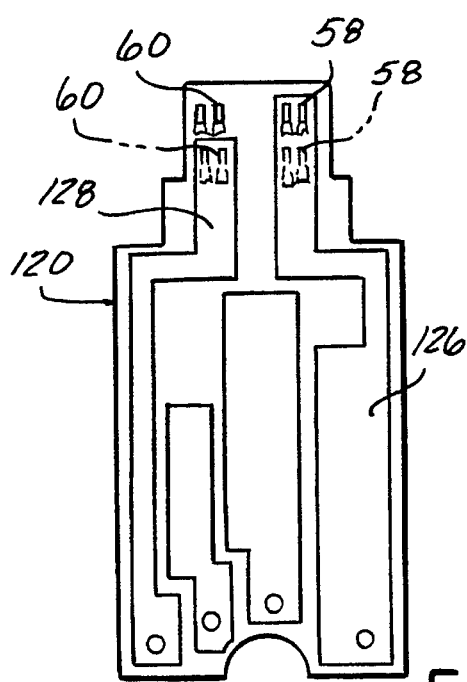
FIG. 8 is a plan view showing the discrete positions of the first electrical contactor on the circuit board.
Figure 9:
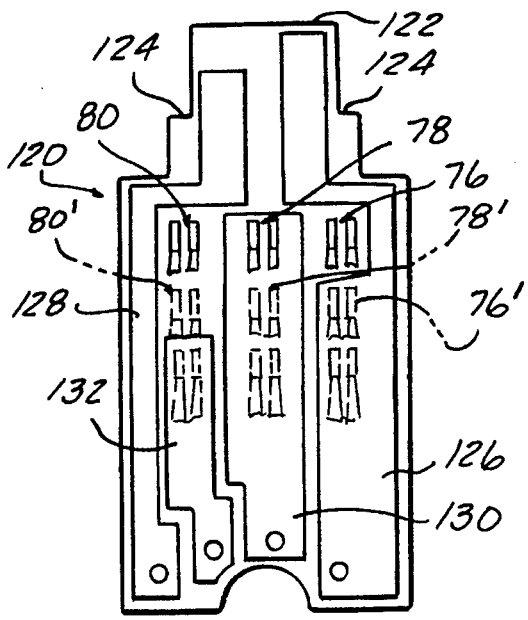
FIG. 9 is a diagrammatic view showing the position of the contacts of the second electrical contact or on the circuit board.

As shown in FIGS. 2 and 3, and in greater detail in FIGS. 8 and 9, the stalk switch assembly 10 also includes a circuit board 120 which is slidably inserted into the housing 12. The circuit board 120 is of conventional construction and is formed of a suitable electrically insulating material. A plurality of electrically conductive traces are formed on one surface of the circuit board 120 and are individually connected to electrical conductors 121, shown in FIG. 1, which are in turn connected to various operating circuits of a cruise control device.

The circuit board 120 is mounted in the housing 12 between the diametrically opposed pairs of ribs 30 and 34. In this orientation, the exposed surface of the conductive traces face the contacts of the first and second electrical contactors 54 and 75 so as to be wiped by the contacts of the contactors 54 and 75 during movement of the button 40 and the carrier 70 as described hereafter. The first end 122 of the circuit board 120, which is inserted toward the second end wall 50 of the button 40, is formed with a necked down region which forms opposed shoulders 124. The shoulders 124 form a seat for the button biasing spring 52. As the circuit board 120 is held in a fixed position within the steering column stalk switch apparatus 10, as described hereafter, the biasing spring 52 normally biases the button 40 to a first position toward the second end 16 of the knob housing 12 as shown in FIG. 2. However, user exerted force on the solid end wall 50 of the button 40 is capable of overcoming the force of the biasing spring 52 and move the button 40 to a second position in which the contacts of the first electrical contactor 54 mounted thereon engage certain conductive tracings on the circuit board 120.

As shown in FIG. 8, in the normal first or off position shown in FIG. 2, the contacts 58 and 60 of the first electrical contactor 54 mounted in the button 40 engage the portions of the circuit board 120. In this first position, the first contacts 58 engage a first conductive trace 126 on the circuit board 120. The second electrical contacts 60 engage an insulating portion of the circuit board 120 such that no electrical power flows between the contacts 58 and 60. However, movement of the button 40 to the second position brings the first and second contacts 58 and 60 of the first electrical contactor 54 carried thereon to a second position shown in phantom in FIG. 8. In this position, the first contacts 58 remain in engagement with the conductive trace 126. The second contacts 60, in this second position, engage a second conductive trace 128 thereby forming a circuit between the contacts 58 and 60 to supply electrical power to the set speed circuit of the vehicle cruise control device. Release of the button 40 will enable the biasing spring 52 to return the button 40 to the normal, first position shown in FIG. 2 in which the electrical circuit between the contacts 58 and 60 opens.

It should be noted that the conductive tracings 126 and 128 are disposed in a predetermined length, start point from the first end 122 and timed relationship with respect to the position of the button 40 so as to engage the contacts 58 and 60 in each distinct first and second position of the button 40 as described above.

FIG. 9 depicts the operation of the contacts 76, 78 and 80 of the second electrical contactor 75 mounted on the carrier 70 in various operative states depending upon the position of the carrier 70. In a first position of the carrier 70, as depicted in FIG. 2, the electrical contacts 76, 78 and 80 will be oriented as shown in FIG. 9. The first electrical contacts 76 engage an insulating portion of the circuit board 120. The second electrical contacts are disposed in engagement with a conductive trace 130 on the circuit board 120. The third electrical contacts 80 are also disposed in engagement with an insulating portion of the circuit board 120. This position of the contacts 76, 78 and 80 and the carrier 70 is defined in the exemplary embodiment as an "off" position of the vehicle cruise control device.

Movement of the carrier 70 from the first position shown in FIG. 2 to a second position, as described hereafter, brings the contacts 76, 78 and 80 to the position shown in phantom in FIG. 9 and depicted by reference numerals 76', 78' and 80'. In this position, the first and second electrical contacts 76 and 78 engage the conductive traces 126 and 130, respectively, on the circuit board 120 to form a closed circuit therebetween. The third electrical contact 80' remains in engagement with an insulating portion of the circuit board 120. This position is defined, in the exemplary embodiment, as the "on" position of the vehicle cruise control.

Further movement of the carrier 70 to the right in the orientation shown in FIG. 2 brings the contacts 76, 78 and 80 to a third position shown in phantom in FIG. 9. In this position, each of the contacts 76, 78 and 80 is respectively disposed in contact with the conductive traces 126, 130 and 132 on the circuit board 120. This position is defined, in the exemplary embodiment, as the "resume set speed" position of the vehicle cruise control. The carrier 70 is capable of movement in an opposite direction to the second or first positions at the user's preference.

A hub 140 is mounted on one end 142 of a shaft 144. The hub 140, which is preferably formed of molded plastic, has a cylindrical first end 146 with an internal bore and a key slot which is mountable over the first end 142 of the shaft 144. After the hub 140 is mounted on the first end 142 of the shaft 144, the outer end portion of the first end 142 of the shaft 144 is flared outward to secure the hub 140 in a fixed position on the shaft 144.

It should be noted that FIG. 3 depicts the hub 140 and the shaft 144 90° out of their normal mounting position for reasons of clarity. The hub 140 also includes a pair of spaced longitudinally extending arms 148 and 150 which extend longitudinally from a raised annular end flange 152 on a second end of the hub 140. The arms 148 and 150 are devised to slidably engage key slots 153 and 155, respectively, extending inward from the first end 14 of the knob housing 12, as shown in FIG. 4. This orients the hub 140 in a predetermined position with respect to the housing 12. As further shown in FIG. 4, the first end 14 of the knob housing 12 has a slight, radially inward taper extending from the first end 14. An enlarged annular recess 158 is formed adjacent the taper and receives the raised annular flange 152 on the hub 140 in a snap-together fit to permanently secure the hub 140 to the knob housing 12.

Figure 10:
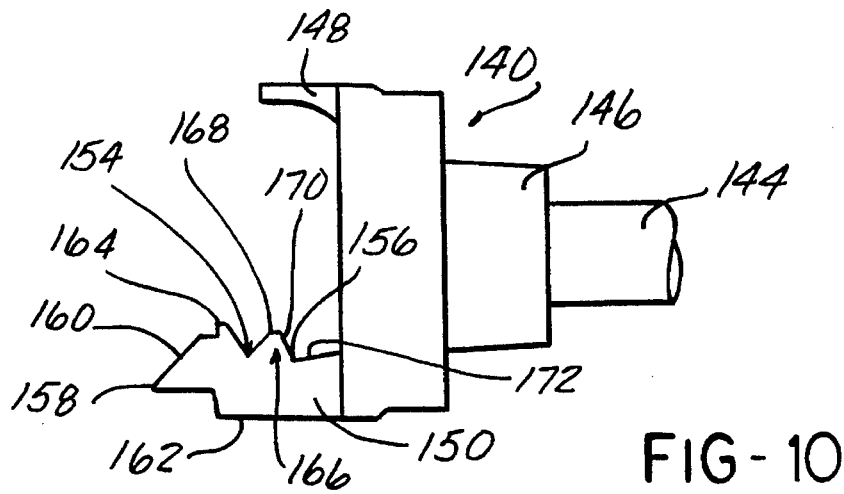
FIG. 10 an enlarged side elevational view of the detents on the hub.
Figure 11:
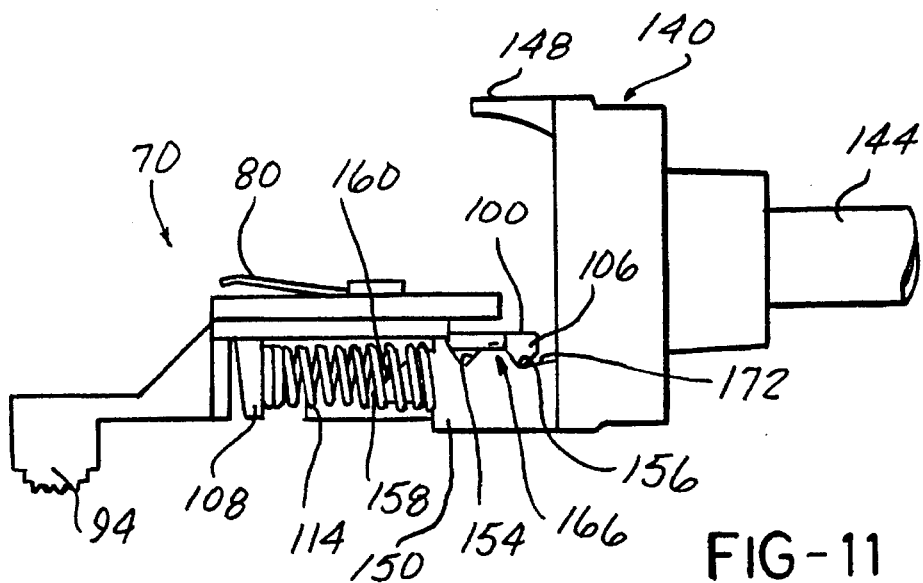
FIG. 11 is an enlarged side elevational view showing the detent paw on the resume set speed ramp.

The second arm 150 is formed with first and second detents 154 and 156, respectively, as more clearly shown in FIGS. 10 and 11. Specifically, the arm 150 has an outer end 158 from which an inclined ramp 160 extends at an acute angle from an outer peripheral portion or base 162 of the arm 150. A raised projection 164 is formed at the top end of the ramp 160. A recess or first detent 154 is formed by an angular surface extending from the projection 164 toward the base 162 of the arm 150. This recess or first detent position 154 defines the "off" position of the vehicle cruise control when the first end 106 of the detent paw 100 is disposed therein, as shown in FIGS. 2 and 10. A second projection 166 is also formed in the arm 150. The second projection 166 is spaced from the first projection 164 and is formed with opposed angularly inclined ramp surfaces 168 and 170, respectively. The second ramp surface 170 terminates in a second detent position 156 as shown in FIG. 10. When the first end 106 of the detent paw 100 is disposed in the second detent position 156, the vehicle cruise control is energized or in the "on" position through the second contacts 76 and 78. In this position, inward movement of the button 40 will set a predetermined vehicle speed for the cruise control device. A further inclined ramp surface 172 extends angularly upward from the second detent position or recess 156 away from the base 152. This ramp surface 172 defines a momentary "resume set speed" position for the vehicle cruise control.

To complete the assembly of the stalk switch apparatus 10, after the circuit board 120 has been slidably inserted into the knob housing 12, as described above, the hub 140, having previously been fixedly mounted on the first end 142 of the shaft 144, will be urged into a snap fit with the first end 14 of the knob housing 12, as also described above. This brings the second end of the hub 140 into fixed engagement with one end of the circuit board 120 so as to fixedly dispose the circuit board 120 in a non-movable position within the stalk switch apparatus 10. During the sliding insertion of the hub 140 into the knob housing 12, the first end 106 of the detent paw 100 will slidably engage the ramp 160 and will pivot from its normal position toward the base 72 of the carrier 70 sufficient to clear the projection 164 and seat in the first detent position 154 in the arm 150 on the hub 140.

In use, movement of the carrier 70 to the right, in the orientation shown in FIG. 2, will cause the first end 106 of the detent paw 100 to move over the projection 166 into the second detent position 156 with a positive stop. Further, movement of the carrier 70 to the right will cause the detent paw 100 to move along the ramp surface 172 to bring the contacts 76, 78 and 80 to the third position shown in phantom in FIG. 9 which activates the resume set speed circuit of the vehicle cruise control.

As shown in FIG. 11, during such movement of the first end 106 of the detent paw 100 along the ramp 172, the first end 158 and end ramp 160 of the arm 150 on the hub 140 slides within the detent biasing spring 114 contained within the inner side walls 90 on the carrier 70 and further compresses the coil spring 114. In this manner, release of the projection 94 on the carrier 70 will enable the coil spring 114 to urge the carrier 70 to the left in the orientation shown in FIG. 11 away from the first end 158 of the arm 150 on the hub 140 to bring the first end 106 of the detent paw 100 back to the second detent position 156. This retains the cruise control in the "on" position. At any time, the user may exert a leftward movement on the projection 94 of the carrier 70 to bring the first end 106 of the detent paw 100 over the projection 166 and back to the first detent position 154, shown in FIG. 10, to deactivate or turn off the vehicle cruise control.

The profiles, ramp angles and heights of the first and second projections, the spring force of the detent spring 114 and the pivot point of the detent paw 100 may be tailored to provide any desired sliding movement and tactile feel for the operation of the carrier 70. Further, these characteristics are chosen so that a positive return of the detent paw 100 from the ramp 172 to the second detent position 166 is insured.

The shaft 144 preferably comprises a hollow cylinder having a second end 180 opposed from the first end 142. A gear means 182 is fixedly mounted on the second end 180 of the lever 144. The gear means 182 by way of example includes an annular collar 184 having an internal key slot 186 which slidably engages a key projection 188 formed on the shaft 144, adjacent the second end 180 thereof. The gear means 182 includes a plurality of radially extending, circumferentially spaced teeth which are designed to engage a driven gear, not shown, mounted in a switch housing attached to the stalk switch assembly 10. The gear means 182 drives the driven gear which, in turn, moves a contact attached thereto between engagement with various fixed contacts mounted in the switch housing to selectively control the operation of an electrical device, such as a vehicle windshield wiper assembly between off, on and a plurality of discrete, intermittent operating speeds depending upon the degree and direction of rotation of the housing 12. By way of example only, the gear means 182 comprises a non-involute gear disclosed in U.S. Pat. No. 5,259,262 issued Nov. 9, 1993, in the name of Daniel J. DuRocher, one of the present Applicants, and entitled "NON-INVOLUTE GEAR" the contents of which are incorporated herein by reference. A C-ring 190 is slidably engageable in an annular recess 192 formed on the shaft 144, adjacent the second end 180 thereof, to retain the gear means 182 on the shaft 144.

As shown in FIGS. 2 and 3, the second end 180 of the shaft 144 is pivotally connected to a switch housing 201 for pivotal movement in at least one of two mutually separate planes, i.e., generally vertical and horizontal. The pivot connections used to pivotally attach the lever 144 to the switch housing 201 and the various operators moved by such pivotal movement of the entire stalk switch apparatus 10 in two mutually exclusive planes can be had by referring to U.S. Pat. No. 5,049,706, filed in the name of Daniel J. DuRocher, one of the present Applicants, and entitled "MULTIFUNCTION STEERING COLUMN SWITCH" the contents of which are incorporated herein by reference.

As shown in FIGS. 2 and 3, a lever 200 having a generally hollow, elongated cylindrical shape is mounted concentrically about the shaft 144. A bearing 202 is mounted in one end of the lever 200, preferably by a snap fit, to rotatably mount the shaft 144 within the lever 200. The opposite end of the lever 200 has an outwardly extending flange 204 with an internal bore 206 which receives a spring-biased plunger.

Finally, to complete the steering column stalk switch apparatus 10, an outer washer paddle housing 210 having a generally cylindrical shape with a larger diameter first end 212, and a side wall which tapers to a smaller diameter, opposed second end 214, is rotatably disposed over the lever 200. The housing 210 receives a bearing 216 in the first end 212 through which the shaft 144 rotatably extends. The second end 214 of the housing 210 rotatably rests on the exterior surface of the lever 200. A plurality of radially extending, circumferentially spaced projections 218 are formed on the exterior surface of the housing 210 for mounting a rubber boot around the switch assembly thereto in a conventional manner. A paddle arm 220 is integrally formed with and extends radially outward from the first end 212 of the housing 210 to provide a convenient gripping surface for rotating the housing 210.

In summary, there has been disclosed a unique steering column mounted stalk switch apparatus which has a simplified construction over previously devised stalk switches. The present stalk switch apparatus presents a positive tactile feel and smooth movement of the various sliding members and movable button between various positions. Furthermore, the stalk switch apparatus is designed to positively prevent any sticking of the sliding member in the temporary resume set speed position of a vehicle cruise control device.

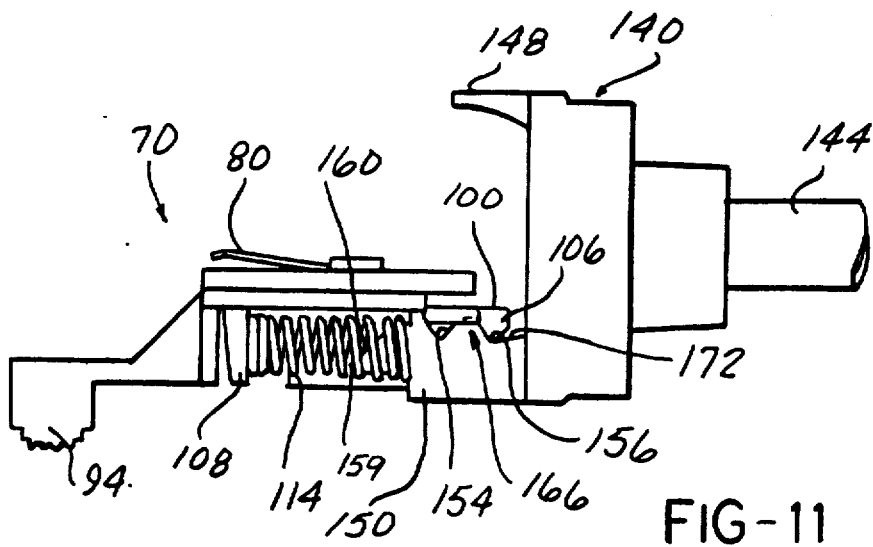

What is claimed is:

1. A steering column stalk switch apparatus comprising:
   an elongated shaft having first and second opposed ends, the first end being pivotally attached to a switch housing;
   a hub fixedly mounted to the second end of the shaft;
   a hollow housing with first and second ends the hub fixedly engaging the first end of the housing;
   a circuit board disposed in the housing and fixedly engaging the hub, the circuit board including a plurality of electrically conductive tracings disposed at timed intervals, electrical conductors connected to the conductive tracings and extending exteriorly of the shaft;
   a first aperture formed in the second end of the housing;
   a button mounted in the housing and movable in the first end of the housing between first and second positions;
   button biasing means, mounted in the housing and seated between the circuit board and the button, for biasing the button to the first position;
   a plurality of first electrical contacts mounted in the button and engaging certain conductive tracings on the circuit board when the button is in the second position to close an electrical circuit connected to the certain conductive tracings;
   a carrier having first and second opposed ends, the carrier slidably mounted in the housing;
   a radially outwardly extending projection formed on the second end of the carrier and slidably extending through a side wall aperture formed in the housing adjacent the second end of the housing;
   a detent paw having first and second opposed ends mounted on the carrier for movement between first and second positions;
   means, mounted on the carrier and engaging the second end of the detent paw, for biasing the detent paw to the first position;
   an arm formed on the hub and extending axially therefrom, first and second spaced detents formed on the arm;
   the arm and the first end of the detent paw being axially aligned such that the first end of the detent paw is slidably movable between the first and second detents upon sliding movement of the carrier;
   the detent paw biasing means engaging the arm when the carrier is urged to a position in which the first end of the detent paw extends beyond the second detent and for biasing the carrier to the second detent; and
   a lever mounted about the shaft and contiguous with the exterior surface of the housing.

2. The stalk switch apparatus of claim 1 wherein:
   the arm includes a surface extending angularly from the second detent.

3. The stalk switch apparatus of claim 2 wherein:
   the first detent defines a vehicle cruise control off position;
   the second detent defines a vehicle cruise control on position; and
   the angular surface defines a vehicle cruise control resume set speed position.

4. The stalk switch apparatus of claim 1 further comprising:
   a plurality of second electrical contacts mounted on the carrier, each of the second electrical contacts having resilient arms cantilevered from a first end attached to the carrier and movably disposed away from the carrier.

5. The stalk switch apparatus of claim 4 further comprising:
   means, formed on the carrier, for receiving a base carrying the second electrical contacts in a snap fit.

6. The stalk switch apparatus of claim 4 wherein the second end of the plurality of second electrical contacts extends from the first end of the second electrical contacts toward the second end of the button.

7. The stalk switch apparatus of claim 4 wherein:
   the plurality of first electrical contacts are mounted on a base fixedly attached to the button;
   each of the plurality of first electrical contacts having resilient arms cantilevered from a first end affixed to the base to a second end movably disposed away from the base.

8. The stalk switch apparatus of claim 7 wherein:
   the second end of the plurality of first electrical contacts extends from the first end thereof toward the second end of the button.

9. The stalk switch apparatus of claim 4 wherein:
   the circuit board includes a plurality of second electrically conductive tracings arranged in a second group slidably engaged by the plurality of second electrical contacts;
   each of the second group of second electrically conductive tracings having different starting points from one end of the circuit board for selective engagement with one of the plurality of second contacts as the second contacts are moved with the carrier.

10. The stalk switch apparatus of claim 9 wherein:
    the second group of electrically conductive tracings on the circuit board are connected to the off, on and resume set speed circuits of a vehicle cruise control apparatus; and the second electrical contacts, the first and second detents and the angular ramp on the arm of the hub being disposed in a timed relationship such that the first detent defines the off position of the vehicle cruise control apparatus, the second detent defines the on position of the vehicle cruise control apparatus and the angular ramp defines a momentary resume set speed position of the vehicle cruise control apparatus.

11. The stalk switch apparatus of claim 1 wherein:

the plurality of first electrical contacts are mounted on a base fixedly attached to the button;

each of the plurality of first electrical contacts having resilient arms cantilevered from a first end affixed to the base to a second end movably disposed away from the base.

12. The stalk switch apparatus of claim 11 wherein:

the second end of the plurality of first electrical contacts extends from the first end thereof toward the second end of the button.

13. The stalk switch apparatus of claim 1 wherein:

the hub and the housing are fixedly engageable in a snap fit.

14. The stalk switch apparatus of claim 13 wherein:

the hub has a radially extending annular flange formed at one end; and the housing has a radially outwardly extending, internal annular recess formed adjacent the first end thereof for receiving the annular flange on the hub.

15. The stalk switch apparatus of claim 1 wherein:

the circuit board includes a plurality of first electrically conductive tracings arranged in a first group slidably engaged by the first electrical contacts; and each of the first group of electrically conductive tracings having different starting points from one end of the circuit board for selective engagement with selected ones of the first electrical contacts as the first electrical contacts are moved with the button between the first and second positions of the button.

16. The stalk switch apparatus of claim 1 wherein:

the first electrical contacts are coupled to a set speed circuit of a vehicle cruise control apparatus.

17. The stalk switch apparatus of claim 1 wherein the arm includes:

a base wall;

a first end connected to the hub;

a second end spaced from the first end and extending axially outward from the hub;

a first projection extending from the second end of the arm in a predetermined profile from the base wall;

a second projection formed on the arm and spaced from the first projection and extending in a second profile, the first detent being formed between the first and second projections; and an angular ramp extending from the terminus of the second projection angularly from the base wall at a predetermined selectable angle, the second detent being formed between the second projection and the angular ramp.

18. The stalk switch apparatus of claim 17 wherein the carrier further comprises:

a base;

a pair of spaced walls formed on the base, an inward extending flange formed on one end of each wall and facing and spaced from the flange on the opposed wall to define an aperture through the walls;

the detent paw mounted about the walls and on the base of the carrier, the first end of the detent paw disposed adjacent to and outside of the aperture between the flanges on the wall; and the means for biasing the detent paw including:
a coil spring seated between the flanges on the walls of the carrier and the second end of the detent paw.

19. The stalk switch apparatus of claim 18 further comprising:

the coil spring being aligned with the arm on the hub so as to be compressed when the carrier is urged to a position moving the first end of the detent paw along the angular ramp on the arm of the hub.

20. The stalk switch apparatus of claim 1 further comprising:

first and second pairs of diametrically opposed ribs formed internally in the housing;

the circuit board being supported between the first and second pairs of ribs; and the carrier being supported between one of the first and second pairs of ribs and the housing.

21. The stalk switch apparatus of claim 1 wherein the lever is rotatably supported on the shaft.

22. The stalk switch apparatus of claim 1 wherein:

the button biasing means urges the circuit board into engagement with the hub.

23. A steering column stalk switch apparatus comprising:

an elongated shaft having first and second opposed ends, the first end being pivotally attached to a switch housing;

a hub fixedly mounted to the second end of the shaft;

a hollow housing with first and second ends, the hub fixedly engaging the first end of the housing;

a circuit board disposed in the housing and fixedly engaging the hub, the circuit board including a plurality of electrically conductive tracings disposed at timed intervals, electrical conductors connected to the conductive tracings and extending exteriorly of the shaft;

a first aperture formed in the second end of the housing;

a button mounted in the housing and movable in the first end of the housing between first and second positions;

button biasing means, mounted in the housing and seated between the circuit board and the button, for biasing the button to the first position;

a plurality of first electrical contacts mounted in the button and engaging certain conductive tracings on the circuit board when the button is in the second position to close an electrical circuit connected to the certain conductive tracings;

a carrier having first and second opposed ends, the carrier slidably mounted in the housing;

a radially outwardly extending projection formed on the second end of the carrier and slidably extending through a side wall aperture formed in the housing adjacent the second end of the housing;

a detent paw having first and second opposed ends mounted on the carrier for movement between first and second positions;

means, mounted on the carrier and engaging the second end of the detent paw, for biasing the detent paw to the first position;

an arm formed on the hub and extending axially therefrom, first and second spaced detents formed on the arm, a ramp surface extending angularly from the second detent;

the arm and the first end of the detent paw being axially aligned such that the first end of the detent paw is slidably movable between the first and second detents upon sliding movement of the carrier;

the detent paw biasing means engaging the arm when the carrier is urged to a position in which the first end of the detent paw extends beyond the second detent and biasing the carrier to the second detent;

a lever mounted about the shaft and contiguous with the exterior surface of the housing;

a plurality of second electrical contacts mounted on the carrier, each of the second electrical contacts having resilient arms cantilevered from a first end attached to the carrier and movably disposed away from the carrier;

a plurality of first electrically conductive tracings formed on the circuit board in a first group slidably engaged by the first electrical contacts;

each of the first group of electrically conductive tracings having different starting points from one end of the circuit board for selective engagement with selected ones of the first electrical contacts as the first electrical contacts are moved with the button between the first and second positions of the button;

a plurality of second electrically conductive tracings arranged in a second group on the circuit board slidably engaged by the plurality of second electrical contacts;

each of the second group of second electrically conductive tracings having different starting points from one end of the circuit board for selective engagement with one of the plurality of second contacts as the second contacts are moved with the carrier; and the second electrical contacts, the first and second detents and the angular ramp on the arm of the hub being disposed in a timed relationship such that the first detent defines the off position of the vehicle cruise control apparatus, the second detent defines the on position of the vehicle cruise control apparatus and the angular ramp defines a momentary resume set speed position of the vehicle cruise control apparatus.

24. The stalk switch apparatus of claim 23 wherein the second end of the plurality of second electrical contacts extends from the first end of the second electrical contacts toward the second end of the button.

25. The stalk switch apparatus of claim 23 wherein:

the plurality of first electrical contacts are mounted on a base fixedly attached to the button;

each of the plurality of first electrical contacts having resilient arms cantilevered from a first end affixed to the base to a second end movably disposed away from the base.

26. The stalk switch apparatus of claim 25 wherein:

the second end of the plurality of first electrical contacts extends from the first end thereof toward the second end of the button.

27. The stalk switch apparatus of claim 23 wherein:

the plurality of first electrical contacts are mounted on a base fixedly attached to the button;

each of the plurality of first electrical contacts having resilient arms cantilevered from a first end affixed to the base to a second end movably disposed away from the base.

28. The stalk switch apparatus of claim 27 wherein:

the second end of the plurality of first electrical contacts extends from the first end thereof toward the second end of the button.

29. The stalk switch apparatus of claim 23 wherein:

the second group of electrically conductive tracings on the circuit board are respectively connected to the off, on, and resume set speed circuits of a vehicle cruise control apparatus and are respectively engaged by certain of the plurality of second electrical contacts when the plurality of second electrical contacts have been moved by the carrier to the first detent, second detent and angular ramp surfaces, respectively, during movement of the carrier.

30. A steering column stalk switch apparatus comprising:

an elongated shaft having first and second opposed ends, the first end being pivotally attached to a switch housing;

a hub fixedly mounted to the second end of the shaft;

a hollow housing with first and second ends of the hub fixedly engaging the first end of the housing;

a circuit board disposed in the housing and fixedly engaging the hub, the circuit board including a plurality of electrically conductive tracings disposed at timed intervals, electrical conductors connected to the conductive tracings and extending exteriorly of the shaft;

a first aperture formed in the second end of the housing;

a button mounted in the housing and movable in the first end of the housing between first and second positions;

button biasing means, mounted in the housing and seated between the circuit board and the button, for biasing the button to the first position, the button biasing means also urging the circuit board into fixed engagement with the hub;

a plurality of first electrical contacts mounted in the button and engaging certain conductive tracings on the circuit board when the button is in the second position to close an electrical circuit connected to the certain conductive tracings;

a carrier having first and second opposed ends, the carrier slidably mounted in the housing;

a radially outwardly extending projection formed on the second end of the carrier and slidably extending through a side wall aperture formed in the housing adjacent the second end of the housing;

a detent paw having first and second opposed ends mounted on the carrier for movement between first and second positions;

means, mounted on the carrier and engaging the second end of the detent paw, for biasing the detent paw to the first position;

an arm formed on the hub and extending axially therefrom, first and second spaced detents formed on the arm;

the arm and the first end of the detent paw being axially aligned such that the first end of the detent paw is slidably movable between the first and second detents upon sliding movement of the carrier;

the detent paw biasing means engaging the arm when the carrier is urged to a position in which the first end of the detent paw extends beyond the second detent and for biasing the carrier to the second detent;

a lever mounted about the shaft and contiguous with the exterior surface of the housing;

first and second pairs of diametrically opposed ribs formed internally in the housing;

the circuit board being supported between the first and second pairs of ribs; and the carrier being supported between one of the first and second pairs of ribs and the housing.

31. A steering column stalk switch apparatus comprising:

first and second co-axially arranged housing portions independently coaxially rotatable with respect to each other and co-acting to form an elongated, substantially closed stalk switch housing;

first operating means, controlled by rotation of the first housing portion, for operating a first switch means;

second operating means, controlled by rotation of the second housing portion, for operating a second switch means;

circuit means, fixedly mounted in the first housing portion, for forming a plurality of electrical conductors;

a second movable member movably mounted in the first housing portion for movement between at least first and second positions;

a second electrical contact mounted on the second movable member for engaging certain electrical conductors when the second movable member is in the second position for controlling certain operating functions of the vehicle;

a detent paw having first and second opposed ends, the detent paw mounted on the second movable member for movement between first and second positions;

means, mounted on the second movable member and engaging the second end of the detent paw, for biasing the detent paw to the first position;

a hub fixedly mounted to one end of the first housing portion; and an arm formed on the hub and extending axially therefrom, first and second spaced detentes formed on the arm;

the arm and the first end of the detent paw being axially aligned such that the first end of the detent paw is slidably movable between the first and second detents upon sliding movement of the second movable member between the first and second positions;

the detent paw biasing means, engaging the arm when the second movable member is urged to a position in which the first end of the detent paw extends beyond the second detent, for biasing the second movable member to the second detent.

32. The steering column stalk switch of claim 31 further comprising: the first operating means including:

an elongated shaft having first and second opposed ends, the first end rotatably disposed with respect to the first switch means;

a first switch operator, fixedly mounted on the first end of the shaft, for rotating the first switch means between operative states; and the circuit means providing a plurality of electrically conductive tracings disposed at timed intervals;

a first movable member mounted in the first housing portion and movable between first and second portions;

a first electrical contact mounted on the first movable member and engaging certain conductive tracings on the circuit means when the first movable member is in the second position to close an electrical circuit connected to the certain conductive tracings; and biasing means, mounted in the first housing portion, for biasing the first movable member to the first position.

33. The stalk switch apparatus of claim 32 wherein the first and second housing portions form a continuous exterior surface for the stalk switch housing.

34. The stalk switch apparatus of claim 32 wherein the shaft co-axially extends through the second housing portion.

35. The stalk switch apparatus of claim 32 further comprising:

the second switch means operating a certain other vehicle function.

36. The steering column stalk switch apparatus of claim 32 further comprising:

the hub fixedly mounted on the second end of the shaft and engaging the first housing portion for simultaneous rotation of the shaft with the first housing portion;

the electrical conductors are connected to the conductive tracings and extend through the second housing portion.

37. The stalk switch apparatus of claim 32 wherein:

the first electrical contact includes a plurality of bifurcated resilient contacts, each fixed at one end to the first movable member and cantilevered from the first movable member to a opposed end.

38. The stalk switch apparatus of claim 32 wherein the second electrical contact includes a plurality of bifurcated resilient contacts, each fixed at one end to the second movable member and cantilevered from the second movable member to a opposed end.

39. The stalk switch apparatus of claim 32 further comprising:

a third switch means for operating a certain other vehicle function; and means for pivotally connecting the second end of the shaft to the third switch means such that pivotal movement of the shaft in at least one plane switches the third switch means between operative states.

40. The stalk switch apparatus of claim 31 wherein: the arm includes a ramp surface extending angularly from the second detent.

41. A steering column stalk switch apparatus for a vehicle comprising:

first and second co-axially arranged housing portions independently coaxially rotatable with respect to each other and co-acting to form an elongated, substantially closed stalk switch housing;

first operating means, controlled by rotation of the first housing portion, for operating a first switch means;

second operating means, controlled by rotation of the second housing portion, for operating a second switch means;

a first movable member movably mounted in the first housing portion for movement from a first normal position to at least a second position;

a first electrical contact mounted on the first movable member and engaging certain electrical conductors when the first movable member is in the second position to close electrical circuits connected to the certain electrical conductors for controlling certain operating functions of the vehicle;

the first electrical contact includes a plurality of bifurcated resilient contacts, each fixed at one end to the first movable member and cantilevered from the first movable member to a opposed end;

a second movable member movably mounted in the first housing portion for movement between at least first and second positions; and second electrical contacts mounted on the second movable member for engaging certain electrical conductors when the second movable member is in the second position for controlling certain operating functions of the vehicle;

the second electrical contacts include a plurality of bifurcated resilient contacts, each fixed at one end to the second movable member and cantilevered from the second movable member to a opposed end.

42. The stalk switch apparatus of claim 41 wherein:

the first and second electrical contacts are co-planarly aligned within the first housing portion.

43. A steering column stalk switch apparatus for a vehicle comprising:

a housing;

means for movably mounting the housing to a support;

circuit means, stationarily mounted in the housing, for forming a plurality of electrical conductors connected to vehicle operating functions;

a carrier movably mounted in the housing for movement between first and second positions and having an operator extending outward of the housing;

a first electrical contact mounted on the carrier and engaging certain electrical conductors of the circuit means as the carrier moves between the first and second positions;

detent means, formed in the housing, for forming first and second axially spaced detents defining the first and second positions of the carrier;

detent engaging means, mounted on the carrier, for releasibly engaging the first and second detents as the carrier is moved axially between the first and second positions within the housing;

a hub fixedly mounted at a predetermined position within the housing;

the detent means including an arm projecting axially from the hub, the first and second detents being formed on and axially spaced along the arm.

44. The steering column stalk switch apparatus of claim 43 further comprising:

means, formed on the detent means, for providing a temporary third position of the carrier spaced from the second detent; and the detent means engaging the biasing means when the carrier is in the third position to cause the biasing means to move the carrier to the second position when a moving force urging the carrier to the third position is released.

45. The stalk switch apparatus of claim 44 wherein the means for forming a temporary third portion of the carrier comprises:

a ramp angularly and axially extending from the second detent.

46. The stalk switch apparatus of claim 43 further comprising:

means for biasing the carrier to the first position.

47. The stalk switch apparatus of claim 43 wherein the arm comprises:

a first projection formed at an axially outer end;

a second projection spaced from the first projection;

the first detent formed between the first and second projections; and the second detent formed adjacent the second projection at an end of the second projection opposite from the first projection.

48. The stalk switch apparatus of claim 47 further comprising:

a ramp extending angularly from the second projection on the arm and defining a temporary third position of the carrier.

49. The stalk switch apparatus of claim 43 wherein the detent engaging means comprises:

a detent paw having first and second opposed ends mounted on the carrier for movement between first and second positions with respect to the carrier; and means, mounted on the carrier and engaging the second end of the detent paw, for biasing the detent paw to the first position.

50. The stalk switch apparatus of claim 43 wherein the circuit means comprises:

a circuit board including a plurality of electrically conductive tracings disposed at timed intervals, electrical conductors connected to the conductive tracings and extending from the housing; and the first electrical contact comprises a plurality of electrical contacts engaging certain conductive tracings on the circuit board as the carrier moves between the first and second positions in the housing.

51. A steering column stalk switch apparatus for a vehicle comprising:

a housing;

means for movably mounting the housing to a support;

circuit means, stationarily mounted in the housing for forming a plurality of electrical conductors connected to vehicle operating function;

a carrier movably mounted in the housing for movement between first and second positions and having an operator extending outward of the housing;

a first electrical contact mounted on the carrier and engaging certain electrical conductors of the circuit means as the carrier moves between the first and second positions;

detent means, formed in the housing, for forming first and second axially spaced detents defining the first and second positions of the carrier;

detent engaging means, mounted on the carrier, for releasibly engaging the first and second detents as the carrier is moved axially between the first and second positions within the housing;

a hub fixedly mounted at a predetermined position within the housing;

the detent means including an arm projecting axially from the hub, the first and second detentes being formed on and axially spaced along the arm;

means for biasing the detent engaging means to a detent engaging function; and means, formed on the detent means, for providing a temporary third position of the carrier spaced from the second detent;

the detent means engaging the biasing means when the carrier is in the third position to cause the biasing means to move the carrier to the second position when a moving force urging the carrier to the third position is released.

* * * * *

UNITED STATES PATENT AND TRADEMARK OFFICE
CERTIFICATE OF CORRECTION

PATENT NO. : 5,453,588
DATED : September 26, 1995
INVENTOR(S) : Daniel J. DuRocher and Ellsworth S. Miller It is certified that error appears in the above-indentified patent and that said Letters Patent is hereby corrected as shown below:

```
        Column 4, line 28, delete "generally".
        Column 4, line 29, delete "taken along line 2-2" and
insert --of the steering column stalk switch shown--.
        Column 4, line 32, delete "and" and insert
--end--.
        Column 4, line 49, after ";" insert --and--.
        Column 4, line 56, delete "drawing" and insert
--drawings--.
        Column 5, line 45, delete "2" and insert --3--.
        Column 5, line 55, delete "of the housing 44".
        Column 8, line 6, delete "the", second occurrence.
        Column 8, line 8, delete "contacts" and insert
--contact--.
        Column 8, line 8, delete "engage" and insert
--engages--.
        Column 8, line 9, delete "contacts" and insert
--contact--.
        Column 8, line 9, delete "engage" and insert
--engages--.
        Column 8, line 11, delete "flows" and insert --can
flow--.
        Column 8, line 16, delete "contacts" and insert
--contact--.
        Column 8, line 16, delete "remain" and insert
--remains--.
        Column 8, line 17, delete "contacts" and insert
--contact--.
        Column 8, line 17, delete "engage" and insert
--engages--.
        Column 8, line 36, delete "contacts" and insert
--contact--.
```

UNITED STATES PATENT AND TRADEMARK OFFICE
CERTIFICATE OF CORRECTION

PATENT NO. : 5,453,588
DATED : September 26, 1995
INVENTOR(S) : Danniel J. DuRocher and Ellsworth S. Miller It is certified that error appears in the above-indentified patent and that said Letters Patent is hereby corrected as shown below:

Column 8, line 37, delete "engage" and insert --engages--.
Column 8, line 38, delete "contacts are" and insert --contact 78 is--.
Column 8, line 40, delete "contacts" and insert --contact--.
Column 8, line 40, delete "are" and insert --is--.
Column 9, line 18, delete "4" and insert --2--.
Column 9, line 27, delete "158" and insert --159--.
Column 9, line 30, delete "A" and insert --The--.
Column 9, line 30, delete "by" and insert --at the innermost termination of--.
Column 9, line 35, delete "10" and insert --11--.
Column 9, line 48, delete "152" and insert --162--.
Column 9, line 58, delete "dispose" and insert --orient--.
Column 9, lines 59-60, delete "within the stalk switch apparatus 10" and insert --with respect to the housing 12--.
Column 10, line 2, delete ",".
Column 10, line 10, delete "158" and insert --159--.
Column 10, line 12, delete "90" and insert --88--.
Column 10, line 16, delete "158" and insert --159--.
Column 10, line 23, delete "10" and insert --2--.
Column 10, line 26, after "projections" insert --164 and 166--.
Column 10, line 31, delete "166" and insert --156--.

UNITED STATES PATENT AND TRADEMARK OFFICE
CERTIFICATE OF CORRECTION

PATENT NO. : 5,453,588
DATED : September 26, 1995
INVENTOR(S) : Danniel J. DuRocher and Ellsworth S. Miller It is certified that error appears in the above-indentified patent and that said Letters Patent is hereby corrected as shown below:

Column 10, line 35, delete "lever" and insert --shaft--.
Column 10, line 62, delete "lever" and insert --shaft--.
Column 11, line 42, after "hub" insert --,--.
Column 12, line 15, delete "for".
Column 16, line 20, delete "of" and insert --,--.
Column 16, line 64, delete "for".
Column 17, line 37, delete "detentes" and insert --detents--.
Column 19, line 54, delete "portion" and insert --position--.
Column 20, line 32, after "housing" insert --,--.
Column 20, line 54, delete "detentes" and insert --detents--.

Signed and Sealed this

Twenty-second Day of October, 1996

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,453,588   Page 4 of 7
DATED : September 26, 1995
INVENTOR(S) : Daniel J. DuRocher and Ellsworth S. Miller It is certified that error appears in the above-indentified patent and that said Letters Patent is hereby corrected as shown below:

In the Drawings:

Sheet 1, Fig. 1, delete reference numeral 122 and replace with 121.

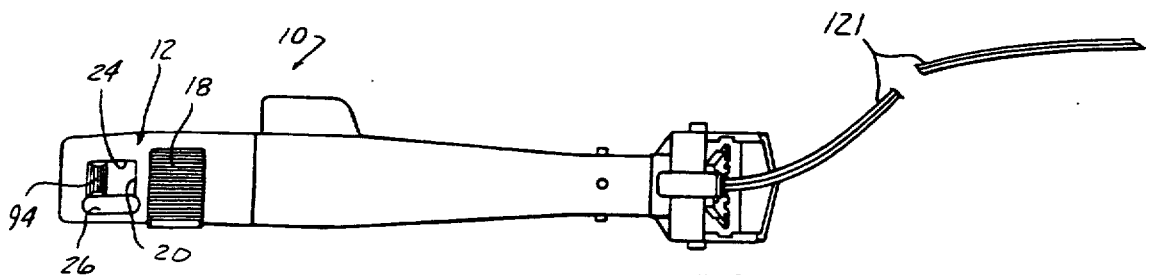

FIG-1

UNITED STATES PATENT AND TRADEMARK OFFICE
CERTIFICATE OF CORRECTION

PATENT NO. : 5,453,588
DATED : September 26, 1995
INVENTOR(S) : Daniel J. DuRocher and Ellsworth S. Miller It is certified that error appears in the above-indentified patent and that said Letters Patent is hereby corrected as shown below:

In the Drawings:

Sheet 4, Fig. 6, delete reference numeral 104 and replace with 102.

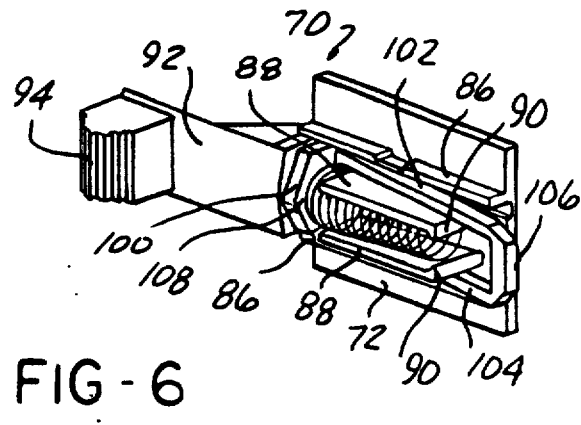

FIG-6

UNITED STATES PATENT AND TRADEMARK OFFICE
CERTIFICATE OF CORRECTION

PATENT NO. : 5,453,588
DATED : September 26, 1995
INVENTOR(S) : Daniel J. DuRocher and Ellsworth S. Miller It is certified that error appears in the above-indentified patent and that said Letters Patent is hereby corrected as shown below:

In the Drawings:

Sheet 3, Fig. 10, delete reference numeral 158 and replace with 159.

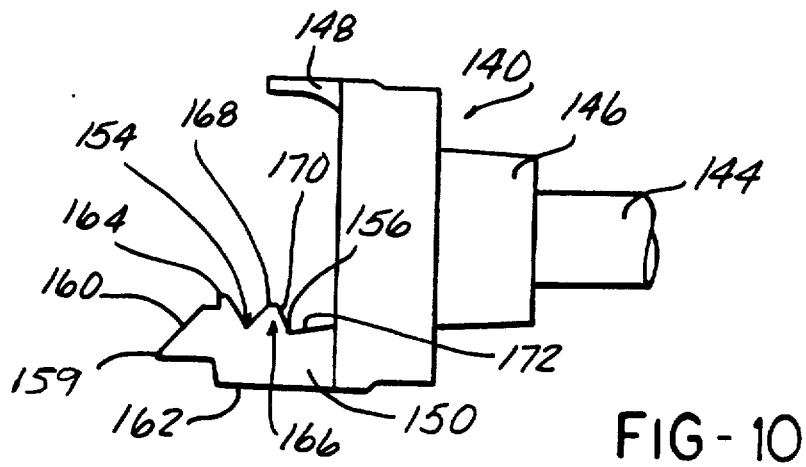

UNITED STATES PATENT AND TRADEMARK OFFICE
CERTIFICATE OF CORRECTION

PATENT NO. : 5,453,588
DATED : September 26, 1995
INVENTOR(S) : Daniel J. DuRocher and Ellsworth S. Miller It is certified that error appears in the above-indentified patent and that said Letters Patent is hereby corrected as shown below:

In the Drawings:

Sheet 3, Fig. 11, delete reference numeral 158 and replace with 159.